Dec. 26, 1961  T. R. E. KRESSMAN  3,014,855
PROCESS OF CONCENTRATING DISSOLVED
SALTS BY ELECTRODIALYSIS
Filed May 5, 1959  3 Sheets-Sheet 1

Inventor
Theodore Roger Ernest Kressman
By
Bailey, Stephens & Huetty Attorneys

Dec. 26, 1961 T. R. E. KRESSMAN 3,014,855
PROCESS OF CONCENTRATING DISSOLVED
SALTS BY ELECTRODIALYSIS
Filed May 5, 1959 3 Sheets-Sheet 2
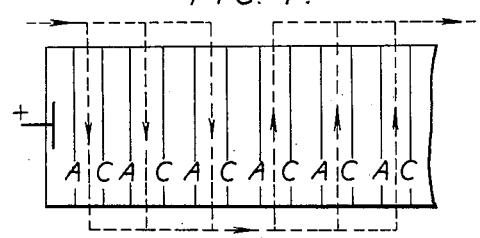
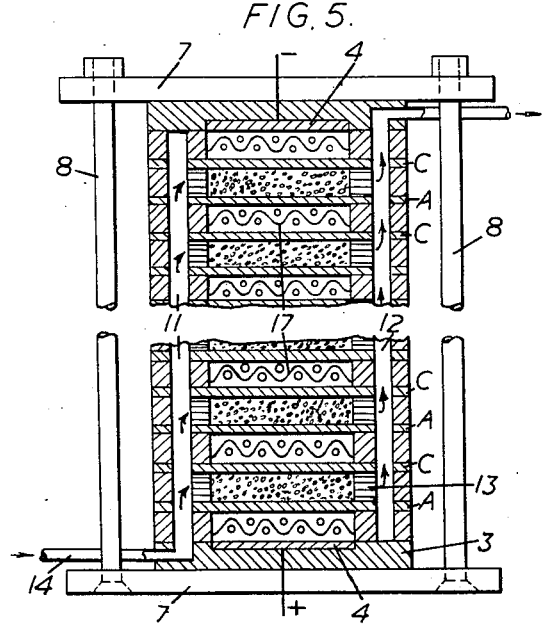
Inventor
Theodore Roger Ernest Kressman
By
Bailey, Stephens & Huetty
Attorneys

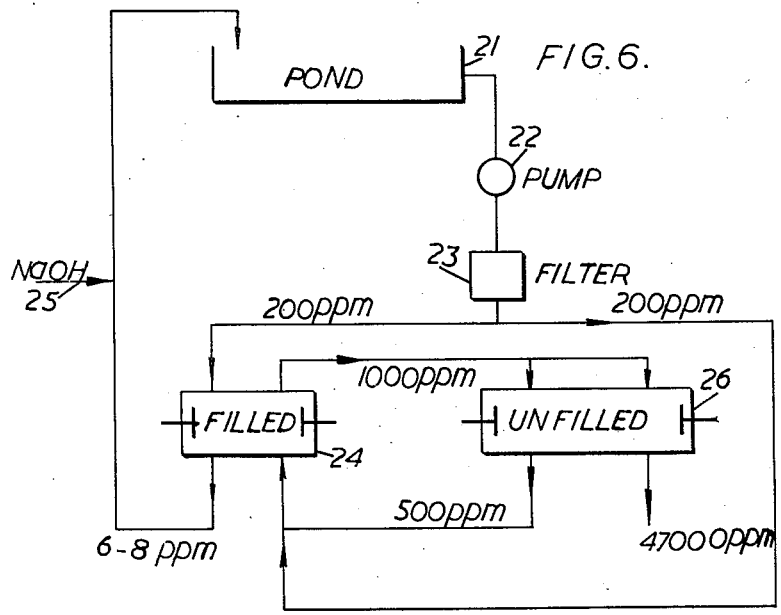
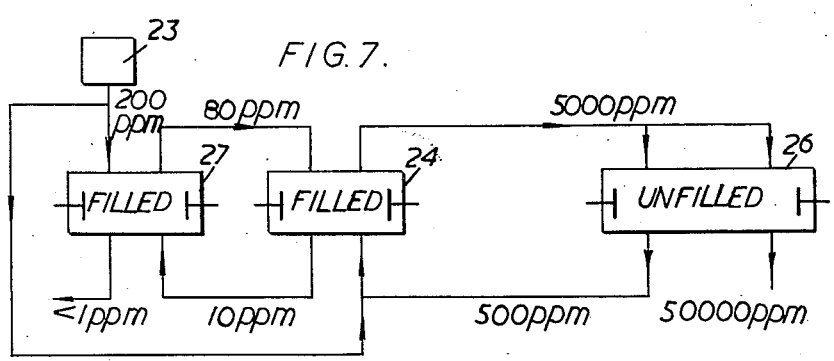

3,014,855
Patented Dec. 26, 1961

3,014,855
PROCESS OF CONCENTRATING DISSOLVED SALTS BY ELECTRODIALYSIS
Theodore Roger Ernest Kressman, Watford, England, assignor to The Permutit Company Limited
Filed May 5, 1959, Ser. No. 811,175
Claims priority, application Great Britain May 7, 1958
7 Claims. (Cl. 204—180)

This invention relates to processes for the treatment of aqueous liquids containing dissolved solids in order to concentrate the dissolved solids.

The invention is based on observations I have made on electrodialytic cells divided into compartments by ion-selective barriers (which are usually membranes), alternate barriers being selectively permeable to ions of one sign and the remaining barriers being selectively permeable to ions of the other sign. It is now well known that if a liquid from which salts are to be removed flows through alternate compartments and the same or another liquid flows through the remaining compartments while a direct current is passed through the whole cell in the appropriate direction, the ions of the salts will migrate from the first liquid to the second. For convenience this first liquid may be called the desalting stream and the second the concentrating stream.

Now the overall electrical efficiency, on which the practical value of the process largely depends, is itself dependent on the conductivity of the streams. The conductivity of the desalting stream falls as the dissolved salts leave it, and the determining factor in the efficiency is the conductivity when the desalting stream leaves the cell.

It is an important object of the invention to improve the efficiency of electrodialytic processes when the liquid under treatment is of low dissolved salt concentration.

It is another object to provide an improved process for concentrating solids dissolved in a liquid to small bulk and simultaneously producing a liquid of very low dissolved solids content.

A further object is to provide an improved process for treating water used for cooling cans of spent radioactive fuel.

For a clear understanding of my invention, an explanation of certain known cell constructions is necessary. When the dissolved salt content of a stream is low, the conductivity of a compartment in which it flows can be increased by filling the compartment with material having ion-exchange properties. Either a mixture of a cation-exchange material and an anion-exchange material may be used, or the solution containing the dissolved salts may flow first through a compartment filled with a cation-exchange material and then through one filled with an anion-exchange material.

Arrangements of compartments containing ion-exchange material are shown diagrammatically in the accompanying drawings, in which:

FIGURE 4 is a diagram showing the flow of one liquid through alternate compartments of a cell as shown in FIGURE 1;

FIGURE 5 shows a cell having compartments containing cation-exchange material;

FIGURE 6 is a circuit diagram showing one process according to the invention; and FIGURE 7 is a circuit diagram of another such process.

Figure 1:
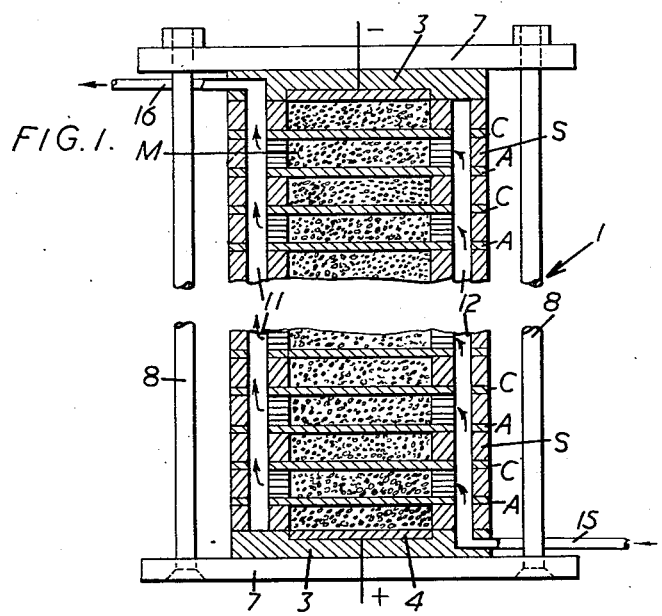
FIGURE 1 shows a few compartments of a cell containing mixed ion-exchange materials.
Figure 2:
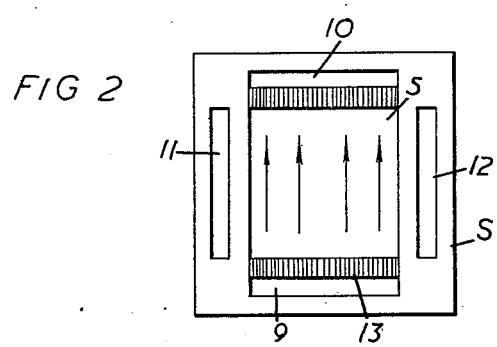
FIGURE 2 shows a spacer used to separate membranes in the cell.
Figure 3:
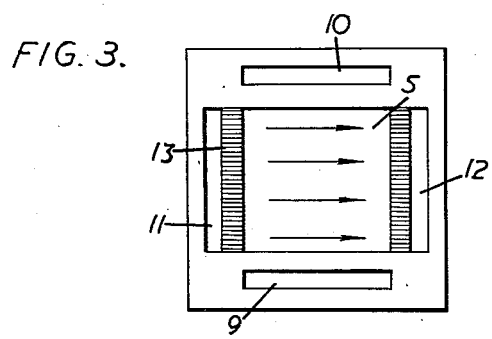
FIGURE 3 shows a second spacer.

The cell 1 shown in FIGURE 1 is of the kind in which membranes A having anion-selective properties alternate with membranes C having cation-selective properties, adjacent membranes being spaced apart from one another by rectangular spacers S. All these spacers are the same in construction, but alternate spacers are turned through 90° relative to one another in the manner shown by FIGURES 2 and 3. Each spacer is a rectangular frame with an open central space 5, and this space, which is bounded on each side by a membrane, forms a compartment. Each spacer has four rectangular openings which register together and with similar openings in the membranes to form passages 9, 10, 11 and 12 for the flow of liquid. In each spacer the inner edges of two opposed openings merge into passage-forming inserts 13 so that the liquid flowing in a passage of which one of these openings forms part can pass into the compartment within the spacer and flow through this compartment to the opposite opening. It will be seen that the flows in adjacent compartments are at right angles to one another.

Each compartment is filled with mixed cation-exchange and anion-exchange materials shown at M.

The stack of spacers and membranes lies between end electrodes 4 which are housed in recesses in end plates 3, and these plates are urged towards one another by bolts 8.

The desalting liquid enters at 15 and flows through the passage 12, passing in parallel streams through every alternate compartment into the passage 11, and finally leaving at 16. The concentrating liquid flows through the passage 9 and the other compartments into the passage 10. These passages 9 and 10 do not appear in the section shown in FIGURE 1.

As shown in FIGURE 1 each liquid flows in parallel streams through all the compartments, but the path of either liquid through such a cell may vary and is determined by the presence or absence of the passage-forming openings. In particular, by employing some spacers having only three such openings instead of four, the compartments may be arranged in groups, the liquid flowing in parallel streams through all the compartments of each group, and the groups being themselves arranged in series. FIGURE 4 illustrates this kind of flow in groups each consisting of three compartments, but this number may vary considerably.

Again the flow of one liquid may be in series through all the compartments.

FIGURE 5 shows a cell in which a cation-exchange material is put in alternate compartments and the remaining compartments are unfilled but contain a corrugated spacing device 17 to keep the two membranes apart. The desalting liquid flows through the filled compartments and the concentrating liquid through the remainder. Both liquids then flow through a similar cell (not shown) in which the filled compartments contain an anion-exchange material. Alternatively all the compartments may be arranged between only two electrodes, i.e. may all be in a single cell.

It is not always advantageous to put ion-exchange material in a compartment. When the dissolved salt content of the stream is high, and so the conductivity of the stream is high, the use of compartments containing ion-exchange material, which will be called filled compartments, actually reduces the overall conductivity. Broadly if the content of dissolved salts in a stream is greater than 1000 p.p.m. (parts per million), it is better not to use filled compartments. Between 1000 and 500 p.p.m. there is an advantage in so doing in many cases, though this is not very pronounced, and when the content of dissolved salts in a stream is less than 500 p.p.m. the compartments through which the stream flows should be filled with ion-exchange material.

Whether or not a compartment is filled with ion-exchange material there is a limit to the extent to which the desalting and concentrating streams can vary in their dissolved salts contents. The reason is that in practice it is impossible to avoid undesired migration of ions from the concentrating stream into the desalting stream and the practical maximum ratio of dissolved salts in the concentrating stream to those in the desalting stream is of the order of 500:1, though this figure depends somewhat on the exact barrier used.

The extent to which the concentration in the concentrating stream can be increased is largely a function of the rate of flow, provided that the ratio of 500:1 is not exceeded. The concentrating stream normally flows at a lower rate than the desalting stream.

Based on these observations, I cause a liquid containing only a small amount of dissolved salts, say less than 1000 p.p.m. and generally less than 500 p.p.m., first to flow through filled compartments as the desalting stream to cause migration of the ions of the dissolved salts into neighbouring compartments in which a concentrating stream flows. At least part of this concentrating stream is in turn subjected to electrodialysis in unfilled compartments as the desalting stream to concentrate the salts and returned from these compartments to form the concentrating stream into which the ions from the original liquid migrate.

It is not necessary to use the whole of the original concentrating stream as the desalting stream in the unfilled compartments, and it is convenient to divide this stream and to use part of it as the concentrating stream into which the ions migrate from those unfilled compartments.

The filled and unfilled compartments may be parts of a single cell, but it is better to arrange them in separate cells. It is then easier to adjust the current density in each cell to the efficiency of that cell. The efficiency of a cell with filled compartments is usually less than that of one with unfilled compartments, even though the former efficiency is greater with the filling than it would be without it.

It will be understood that if a stream contains, say, 1000 p.p.m. dissolved salts, it may be passed through either filled or unfilled compartments so far as the effect on the overall efficiency is concerned. Moreover when a desalting stream flows through filled compartments the corresponding concentrating stream may be so much higher in concentration that it may flow through unfilled compartments. It is, however, generally better from the point of view of cell construction either to fill all the compartments with mixed ion-exchange materials or to leave them all unfilled, so in the preferred process there are two cells, one with all the compartments filled and the other with all the compartments unfilled. The original concentrating stream will thus flow successively in filled and unfilled compartments.

If each filled compartment contains only one kind of ion-exchange material, the compartments on each side of it are unfilled. It follows that the use of such fillings in compartments through which a desalting stream flows is desirable only when the corresponding concentrating stream is of high enough concentration, say over 1000 p.p.m., and certainly over 500 p.p.m., to flow through unfilled cells without loss of efficiency.

Reference has been made above to the ratio of the dissolved salts in the concentrating stream to those in the desalting stream. Although the ratio of 500:1 mentioned has been found to be a practical maximum, it is in fact desirable to maintain the ratio below this, say at a maximum of 100:1. Accordingly if it is desired to reduce the dissolved solids content of a liquid to a very low level, say 1 p.p.m., and at the same time to concentrate the dissolved salts to a considerable extent, the desalting may be effected in stages. The liquid forming the original desalting stream referred to above may be the effluent concentrating stream from additional compartments filled with mixed cation-exchange and anion-exchange materials, the starting liquid flowing as the desalting stream in alternate compartments also filled with mixed cation-exchange and anion-exchange materials. These additional filled compartments may, but need not, form part of an entirely separate cell. Similarly if it is desired to produce a final concentrate of very high concentration, the concentrating stream receiving ions from the unfilled compartments may itself be used as the desalting stream in further unfilled compartments.

The advantages obtained by the invention will be better understood by a description of one type of process to which it may be applied.

In atomic power stations fuel elements are withdrawn from the pile when they are spent and are normally stored under water in a pond to allow the radioactivity to die down before they are removed and taken away for reprocessing. The elements are contained in cans and to reduce the corrosive attack of the water on the cans the water is maintained alkaline. Usually the water contains approximately 200 p.p.m. of caustic soda. Naturally, the water picks up carbon dioxide from the atmosphere and this reacts with the caustic soda to form sodium carbonate, with the result that the pH of the water is reduced. To counteract this effect, part of the water is continuously withdrawn and circulated through an ion-exchange plant to remove all the salts and is then returned after being dosed with fresh caustic soda.

The ion-exchange plant used hitherto has comprised a bed of cation-exchange material working on the hydrogen cycle and a bed of mixed cation-exchange and anion-exchange materials, and carbon dioxide has been removed from the water during its passage from the first of the beds to the second.

Naturally both beds must be regenerated from time to time, and the effluent regenerant must be disposed of. There is no difficulty about this unless one or more of of the cans has burst. If there is a burst can, the water withdrawn to the ion-exchange plant contains radioactivity, and this is concentrated in the regeneration effluent from the ion-exchange beds. Depending on the magnitude of the radioactivity, it may be necessary to can the regeneration liquor and dispose of it either at sea or by burying it, or alternatively to remove the whole of the ion-exchange material and bury this. Such a state of affairs is abnormal, but it is necessary to have regard to it.

Compartments arranged according to the present invention may be used instead of an anion-exchange plant for the removal of dissolved salts from the cooling water withdrawn from such a pond in an atomic power station. There is a dual object, namely to concentrate the salts as much as possible and to demineralise as much as possible the water returned to the pond.

One such process is illustrated diagrammatically in FIGURE 6. Here the cooling pond is shown at 21, a pump at 22 and a filter at 23. Water withdrawn from the pond is delivered by the pump 22 through the filter 23 to desalting compartments in a multi-compartment cell 24. The concentrating compartments are not filled.

In this cell 24, there are 120 anion-selective and 120 cation-selective membranes, each composed of ion-exchange beads bonded by polyvinyl chloride. These membranes are arranged alternately to form a total of 241 compartments, the end compartments being electrode compartments and having a membrane on one side only. The compartments are each 20" square, alternate compartments serving as desalting and concentrating compartments, desalting occurring in those bounded on the anode side by an anion-selective membrane and on the cathode side by a cation-selective membrane.

The spacers are 0.1" thick and the desalting compartments (except the electrode compartments) are filled with an intimate mixture of −14 +52 B.S.S.-mesh granules of a sulphonated cross-linked polystyrene cation-exchange resin and a chlormethylated and aminated cross-linked polystyrene anion-exchange resin, the mixture being in the ratio of 2 parts anion exchanger to 1 part cation exchanger by volume.

Both the desalting liquid (the water withdrawn from the pond) and the concentrating liquid (a separate stream of water) flow in parallel streams through all the respective compartments, as illustrated by FIGURE 1.

The water from the pond contains 200 p.p.m. dissolved salts. In operation a potential of 600 volts is applied across the cell, while the water from the pond flows through the filled compartments at 25 litres per minute, and the current flowing is 5 amperes, and the water emerges in a demineralised state, i.e. containing from 6 to 8 p.p.m. of dissolved solids. The concentrating stream consists of water flowing at a rate of 9.4 litres per minute. The electrode compartments are fed separately and independently with 1% sodium sulphate solution at 100 cc./minute.

The demineralised water from the cell 24 is returned to the pond 21, and is dosed with 100 cc./minute of a 4.7% solution of caustic soda on the way as shown at 25.

The concentrating stream which emerges from the unfilled compartments of the cell 24 contains about 1000 p.p.m. dissolved salts by weight, these being mainly caustic soda and sodium carbonate. This stream is fed to unfilled compartments of a second cell 26, where it forms the desalting stream, flowing at rate of 9.3 litres per minute.

In the cell 26 the spacers are 0.05" thick and each compartment contains a sheet of coarse woven plastic gauze such as that shown at 17 in FIGURE 5 to keep the membranes apart. The desalting compartments are arranged in series-parallel, as illustrated by FIGURE 4, there being ten groups arranged in series and each group consisting of twelve compartments arranged in parallel. The concentrating compartments are arranged all in series.

100 cc./minute of the effluent concentrating stream from the cell 24 flows as the concentrating stream in the cell 26. A potential of 41 volts is applied across this cell to produce a current of 2.1 amperes. In this cell the solids are reduced in the desalting compartments to about 500 p.p.m., while the concentration in the concentrating stream is raised to 47,000 p.p.m. This stream (100 cc. per minute) can be disposed of fairly easily, e.g. by canning and dumping in the sea if it is radioactive. This stream may itself, as shown, consist of part of the desalting stream from the cell 24.

The original concentrating stream, after treatment as the desalting stream in the cell 26, is returned at the rate of 9.3 litres per minute to the cell 24 as the concentrating stream mixed with 100 cc. of withdrawn cooling water per minute.

It is possible by means of the invention to produce from every thousand gallons withdrawn from the cooling pond 996 gallons of demineralised water for return to the pond after caustic dosing and 4 gallons for disposal as concentrated sodium carbonate and caustic soda solution.

If the demineralised water should have a very low concentration of dissolved solids, say only 1 p.p.m., the modification diagrammatically shown in FIGURE 7 may be used. Here the water from the filter 23 flows to filled desalting compartments of an additional cell 27 and is reduced to a concentration of 1 p.p.m. for return to the pond. The concentrating stream emerges with a concentration of about 80 p.p.m. and flows to the cell 24 to become the desalting stream in it. Here it is reduced to, say, 10 p.p.m. and returned as the concentrating streams to the cell 27. There is a pump (not shown) circulating the liquid between cells 24 and 27. In view of the low conductivity of this stream, the compartments through which it flows in the cell 27 are filled. The concentrating stream in the cell 24 is (as in FIGURE 6) the effluent desalting stream from the cell 26, and it may enter at a concentration of 500 p.p.m. and leave at a concentration of 5000 p.p.m., it being understood as explained above that this increase depends largely on the rate of flow. As before, water equal in volume to the effluent concentrating stream from the cell 26 is taken from the outlet side of the filter 23 to form part of the concentrating stream in the cell 24.

The materials in the filled compartments may be either granules of ion-exchange materials or larger pieces of ion-exchange material.

The invention may be applied with advantage to any effluent, radioactive or otherwise, in which it is desired to concentrate the solids to small bulk and at the same time to produce a water of very low content of total dissolved solids.

I claim:

1. In an electrodialytic process of the kind in which liquid streams containing dissolved salts are passed through alternate compartments bounded by ion-selective membranes to cause migration of ions from a desalting stream to a concentrating stream under the influence of an electric current, a method of concentrating the salts dissolved in a liquid containing no more than 1000 p.p.m. of such dissolved salts which comprises passing the liquid as the desalting stream through compartments filled with material having ion-exchange properties to cause migration of the ions of the dissolved salts into neighbouring compartments in which a concentrating stream flows, in turn subjecting at least part of this concentrating stream to electrodialysis in unfilled compartments as the desalting stream to concentrate the salts into a second concentrating stream, and returning this desalting stream from said unfilled compartments to form at least part of the concentrating stream into which the ions from the original liquid migrate.

2. A process according to claim 1 in which the original concentrating stream is divided and forms not only the desalting stream in unfilled compartments but also the concentrating stream into which the ions migrate from those unfilled compartments.

3. A process according to claim 1 in which the filled and unfilled compartments are in separate cells.

4. A process according to claim 3 in which all the compartments receiving the concentrating stream in the first cell are also filled with ion-exchange material.

5. A process according to claim 1 in which the filled compartments contain both cation-exchange material and anion-exchange material.

6. A process according to claim 1 in which said liquid containing the dissolved salts is water used for cooling cans containing spent radioactive elements.

7. In an electrodialytic process of the kind in which liquid streams containing dissolved salts are passed through alternate compartments bounded by ion-selective membranes to cause migration of ions from a desalting stream to a concentrating stream under the influence of an electric current, a method of concentrating the salts dissolved in a liquid containing less than 500 p.p.m. dissolved salts which comprises passing the liquid as the desalting stream through compartments filled with material having ion-exchange properties to cause migration of the ions of the dissolved salts into neighbouring compartments in which a first concentrating stream flows, in turn subjecting at least part of said concentrating stream to electrodialysis in further filled compartments as the desalting stream to concentrate the salts into a second concentrating stream, subjecting a part of said second concentrating stream to electrodialysis in unfilled compartments as the desalting stream to concentrate the salts into a third concentrating stream and returning said last mentioned desalting stream from said unfilled compartments to form part of said second concentrating stream.

(References on following page)

References Cited in the file of this patent

UNITED STATES PATENTS

| | | |
|---|---|---|
| 2,694,680 | Katz et al. | Nov. 16, 1954 |
| 2,815,320 | Kollsman | Dec. 3, 1957 |
| 2,860,095 | Katz et al. | Nov. 11, 1958 |
| 2,881,124 | Tye | Apr. 7, 1959 |
| 2,923,674 | Kressman | Feb. 2, 1960 |

OTHER REFERENCES

Walters et al.: "Industrial and Engineering Chemistry," vol. 47, No. 1 (1955), pages 61–66.